Jan. 14, 1936.  J. L. NALL  2,027,874
BRAKE SHOE EQUALIZING DEVICE
Filed Feb. 4, 1935
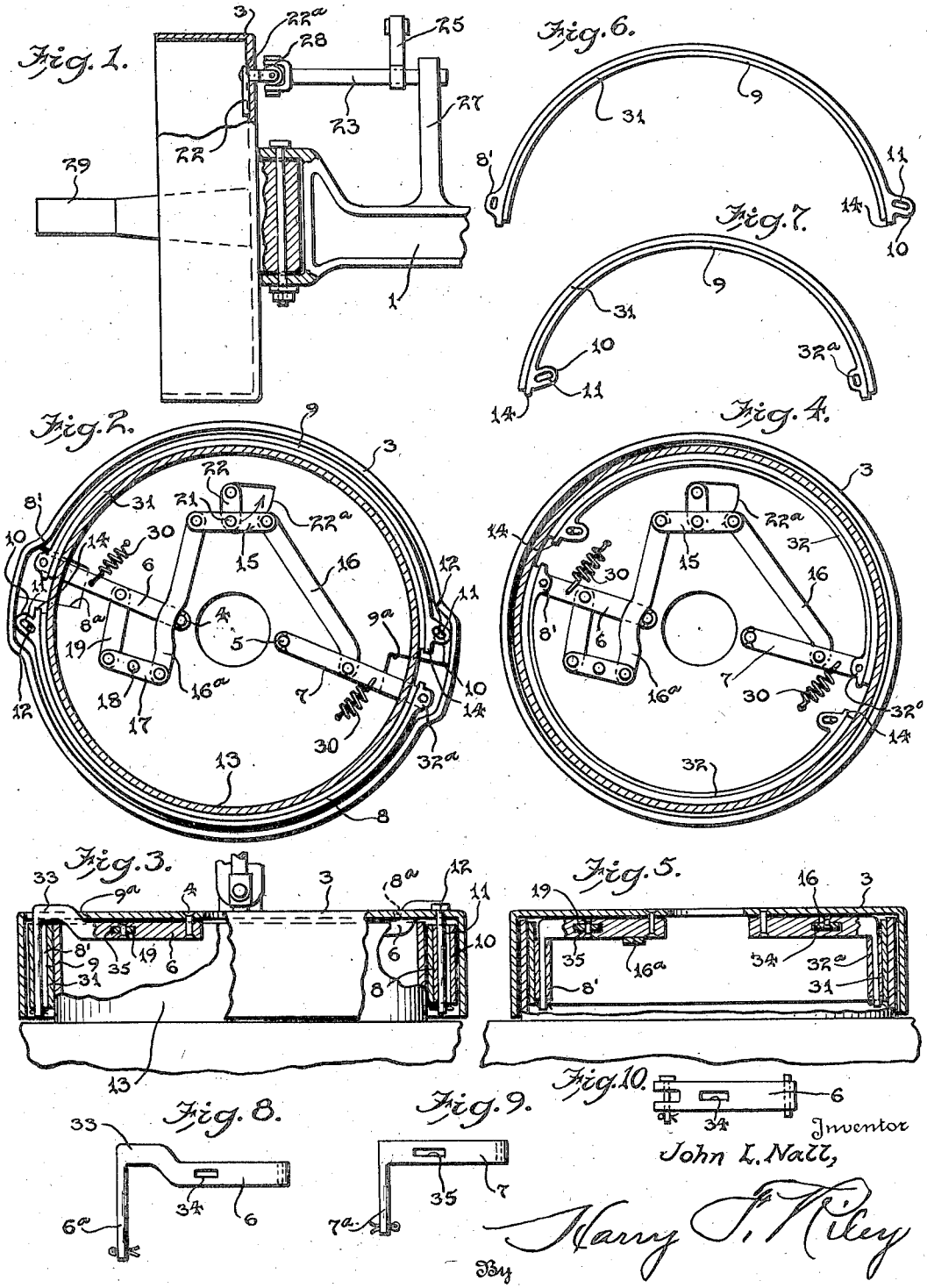

Patented Jan. 14, 1936

2,027,874

UNITED STATES PATENT OFFICE 2,027,874

BRAKE SHOE EQUALIZING DEVICE

John L. Nall, Danville, Va.

Application February 4, 1935, Serial No. 4,949

3 Claims. (Cl. 188—78)

The invention relates to a brake shoe equalizing device and is a continuation in part of an application filed by me March 2, 1934, Serial No. 713,722.

The object of the present invention is to provide a simple, practical and efficient brake shoe equalizing device of strong, durable and comparatively inexpensive construction designed for use on various types of motor vehicles and having means for equalizing the pressure between the brake shoes adapted for use on vehicle brakes having brake shoes of either the expanding or contracting type.

With these and other objects in view, the invention consists in the construction and novel combination and arrangement of parts hereinafter fully described, illustrated in the accompanying drawing and pointed out in the claims hereto appended, it being understood that various changes in the form, proportions and minor details of construction may be resorted to without departing from the spirit or sacrificing any of the advantages of the invention.

In the drawing:

Figure 1 is a transverse sectional view of a portion of the brake equalizing mechanism shown and described in the aforesaid application and illustrating the manner of mounting the housing and the brake shoe operating rock shaft on the front axle of a vehicle.

Figure 2 is an enlarged elevation of the brake shoe equalizing device having contracting brake shoes.

Figure 3 is a transverse sectional view of the same taken through one of the brake shoe actuating levers.

Figure 4 is an elevation of the brake shoe equalizing device having expanding brake shoes.

Figure 5 is a transverse sectional view of the same through one of the brake shoe actuating levers.

Figure 6 is a detail view of one of the contracting brake shoes.

Figure 7 is a similar view of one of the expanding brake shoes.

Figure 8 is a detail view of one of the levers for operating the contracting brake shoes.

Figure 9 is a detail view of one of the levers for actuating one of the expanding brake shoes.

Figure 10 is a detail view illustrating a modification of the lever for actuating the expanding brake shoe.

In the accompanying drawing in which is illustrated the preferred embodiment of the invention, the brake shoe equalizing device is shown applied in Figure 1 of the drawing to the front axle 1 for use in connection with one of the front wheels of the vehicle but as the brake shoe equalizing devices of the front and rear wheels of a vehicle are of the same construction, a description of one of the brake shoe equalizing devices or brake units will be sufficient to a full understanding of the operation of all of the brake units of a vehicle.

Each brake unit comprises in its construction a brake housing 3 on which are fulcrumed at their inner ends on suitable studs or pivots 4 and 5 brake shoe actuating levers 6 and 7 which are connected at their outer ends to brake shoes 8 and 9 and which at their outer portions operate in recesses 8ᵃ and 9ᵃ. The brake levers 6 and 7 extend outwardly from their pivots 4 and 5 to the periphery of the brake housing which is provided with the said recesses 8ᵃ and 9ᵃ and each brake shoe operating lever is suitably secured to one of the brake shoes at one end thereof and the said brake shoe is provided at its other end with an angularly disposed lug or enlargement 10 having a slot 11 for the reception of a relatively fixed stud 12 which is adapted when the brake shoe actuating lever is oscillated to cause a movement of the brake shoe toward or from the brake drum 13 with which it is associated, according to the direction of the movement of the brake shoe actuating lever. The brake shoe normally, when the brake is not applied, is arranged in spaced relation with the brake drum and when the brake shoe actuating lever is moved in a direction to apply the brake the brake shoe moves inwardly with respect to the brake drum through the action of the angularly related slot 11 of the lug or enlargement 10 and the stud 12. The terminal portions 14 of the brake shoes adjacent the lug or enlargement 10 extend circumferentially beyond the end of the lug or enlargement 10 and partake of the general curvature of the brake shoe.

When the brake shoe is used for a contracting brake, the lug 10 will be arranged at an acute angle to the terminal portion 14 at the outer side of the brake shoe, as clearly illustrated in Figure 6 of the drawing, and when the brake shoe is used as an expanding brake the lug will be arranged at an obtuse angle to the terminal portion at the inner side of the brake shoe, as clearly shown in Figure 7 of the drawing.

The lever 7 is connected with one end of a brake shoe equalizing lever 15 by a link 16 and the other end of the brake shoe equalizing lever 15 is connected by a link 16ᵃ with a pivoted lever 17 fulcrumed intermediate its ends at 18 on a suitable stud of the brake housing and connected with the lever 6 by a link 19 pivoted at its ends to the lever 6 and to the lever 17. The brake shoe equalizing lever 15 is centrally connected by a suitable pivot 21 with an arm 22 of a transversely disposed brake shoe operating rock shaft 23. The arm 22 which is located at the outer end of the rock shaft 23 preferably operates in an opening or recess 22ª of the brake housing in order that the levers and the links of the brake shoe equalizing device may be located contiguous to the housing. The brake shoe operating rock shaft 23 is also provided with an operating arm 25 which is connected with the brake equalizing mechanism of the aforesaid application. The rock shaft 23 is mounted in the brackets 27 of the front axle and any number of bearings or brackets may, of course, be provided for the rock shaft 23, which may be mounted in any other desired manner. The rock shafts of the rear brake units of a brake equalizing mechanism are designed to be mounted in suitable bearing brackets as explained in the aforesaid application, and to extend through an opening in the rear axle housing.

The front rock shaft 23 may be composed of inner and outer sections connected by a universal joint 28 of any desired character to render the front rock shaft flexible in character and to enable it to yield to the steering action of the front wheel but any other suitable means may, of course, be provided to permit the necessary movement of the spindle 29 of the front axle in the turning thereof. Any suitable form of universal joint may be employed and as the front spindle may be mounted in any desired manner detailed description of the same is deemed unnecessary and the universal joint where desired may, of course, be omitted.

When the rock shaft 23 is partially rotated to apply the brake, the arm 22 will swing in an arc as indicated by the dotted line in Figure 2 of the drawing and the brake shoes will be moved inwardly and caused to engage the brake drum 13 associated with the brake shoes. When the brake is released, the brake shoes are positively carried out of engagement with the brake drum by means of coiled springs 30 connected with the brake housing and with the brake shoe actuating levers 6 and 7, as clearly illustrated in Figure 2 of the drawing. The levers and links will equalize the pressure between the brake shoes and the brake shoes will be engaged with the brake drum with equal pressure irrespective of the character or condition of the brake lining 31 and even should the brake lining of a brake shoe be entirely worn away the pressure of the brake shoes will be equalized by the equalizing mechanism of the brake unit and as soon as the brake is released the brake shoes will be carried out of engagement with the brake drum.

Both the contracting and expanding brake shoes are readily detachable to enable them to be readily and easily removed and replaced for renewing brake linings or other repair work necessitating their removal and for this purpose the studs 12 are designed to be equipped with cotter pins or other detachable fastening means and the brake levers 6 and 7 are provided with integral transverse arms or studs 6ª and 7ª which are arranged in elongated or elliptical openings of lugs 8' and 32ª of the contracting and expanding brake shoes 8 and 32 respectively. The lugs 8' and 32ª may have round or any other shaped openings and they are located a short distance from the adjacent ends of the said brake shoes 8 and 32. The arms or studs 6ª and 7ª are designed to be provided with cotter pins or other suitable fastening devices to enable the adjacent ends of the brake shoes to be readily and easily disconnected from the levers 6 and 7. By disconnecting the brake shoes from the levers 6 and 7 and from the studs 12, the brake shoes may be readily and easily detached. Also the actuating arm 22 of the rock shaft is detachably secured to the rock shaft in any suitable manner to enable it to be readily placed on and removed therefrom in assembling the parts and when otherwise required. The members of each pair of brake shoes of both the expanding and contracting type are separated a sufficient distance to enable them to move freely and without interference into and out of engagement with the associated brake drum and in practice the brake shoes may, of course, be of any desired length to suit the size of the brake drum with which they are to be used.

When the equalizing mechanism of the brake unit is applied to expand brake shoes 32, the brake shoes will be reversed as illustrated in Figure 4 of the drawing in order that the levers 6 and 7 may actuate the brake shoes in the proper direction for expanding the same. The contracting brake shoe actuating levers 6 and 7 have an offset 33 at their outer portions, as clearly illustrated in Figure 8 of the drawing, to enable them to fit around the brake drum, and the brake shoe actuating levers are preferably provided intermediate their ends with openings 34 and 35 for the links 16 and 19 of the brake shoe equalizing mechanism. Cotter pins or any other suitable means may be provided for the pivots of the linkage which connects the rock shafts with the brake shoes so that any of the parts may be readily removed and replaced when required.

What is claimed is:

1. In combination with a brake drum, brake shoe equalizing means comprising a pair of brake shoes, substantially radially arranged levers located at opposite sides of the center of the brake drum and pivotally mounted at their inner ends and each pivoted at its outer end to one of the brake shoes, an operating rock shaft having an arm, an equalizing lever centrally pivoted to the arm of the rock shaft and arranged to be carried through an arc by the rock shaft, a pair of diverging links pivoted at one end to the ends of the equalizing lever and having their other ends located at opposite sides of the center of the brake drums, and means for connecting the last mentioned ends of the diverging links with the brake shoe actuating levers.

2. In combination with a brake drum, brake shoe equalizing means comprising a pair of brake shoes, substantially radially arranged levers located at opposite sides of the center of the brake drum and pivotally mounted at their inner ends and each pivoted at its outer end to one of the brake shoes, an operating rock shaft having an arm, an equalizing lever centrally pivoted to the arm of the rock shaft and arranged to be carried through an arc by the rock shaft, a pair of diverging links pivoted at one end to the ends of the equalizing lever and having their other ends located at opposite sides of the center of the brake drum, one of the diverging links being pivoted directly to one of the brake shoe actuating levers, and a lever pivoted to the other diverging link and having a link connection with the other brake shoe actuating lever.

3. In combination with a brake drum, brake shoe equalizing means comprising brake shoes provided at one end with an angularly disposed lug having a slot, each brake shoe being provided at the other end with an elongated opening, fixed studs arranged in the slots of the lugs for causing inward and outward movement of the brake shoes, radially arranged brake shoe actuating levers located at opposite sides of the center of the brake drum and pivotally mounted at their inner ends and provided at their outer ends with pivots arranged in the elongated openings of the brake shoes, an operating rock shaft provided with an arm, an equalizing lever centrally pivoted to the arm of the rock shaft and arranged to be carried through an arc by the rock shaft, and a pair of diverging links pivoted at one end to the ends of the equalizing lever and connected at their other ends with the brake shoe actuating levers.

JOHN L. NALL.